Oct. 7, 1924.

P. A. LAWRENCE 1,511,208

REVERSE GEAR FOR CONSTANT PRESSURE INTERNAL COMBUSTION ENGINES

Filed April 5, 1921

Witnesses

Inventor
Paul Andrew Lawrence

Patented Oct. 7, 1924.

1,511,208

UNITED STATES PATENT OFFICE.

PAUL ANDREW LAWRENCE, OF GRAND ISLAND, NEBRASKA.

REVERSE GEAR FOR CONSTANT-PRESSURE INTERNAL-COMBUSTION ENGINES.

Application filed April 5, 1921. Serial No. 458,781.

*To all whom it may concern:*

Be it known that I, PAUL ANDREW LAWRENCE, a citizen of the United States, residing at Grand Island, in the county of Hall and State of Nebraska, have invented a new and useful Reverse Gear for Constant-Pressure Internal-Combustion Engines, of which the following is a specification.

My invention relates to a reverse gear for internal combustion engines. It applies particularly to that kind of engines in which the cam shaft must always revolve in the same direction, regardless of the direction of rotation of the crank shaft. From this, it follows that, when the engine is reversed, means are employed to change the direction of rotation of the cam shaft with regard to the crank shaft.

It is essential that the cam shaft be so connected to the driving gear of the crank shaft that the cams occupy the precise angular relation to the angularity of the cranks, in order that the valve functions may occur at the right moment and in the proper sequence. This makes it necessary, in reversing the engine, that the cam shaft receives precisely the proper angular motion before being connected to the reverse drive.

Reversible engines usually have the required number of cylinders in order to avoid dead centers. Thus, a four cylinder, two cycle engine will start in any position of the crank shaft. The cranks are set ninety degrees apart and, when the engine is reversed, the sequence of the power impulses are reversed. This demands that the reverse gear must not only bring about the proper connections of the cam shaft to the reverse drive, but also to make the required change in the sequence of the valve functions.

In a two cylinder, two cycle engine, it is only necessary, in reversing the engine, to properly connect the cam shaft to the reverse drive.

The drawings illustrate the valve gear of a four cylinder, two cycle vertical type engine having a variable admission period and capable of a very late cutoff. It is started and manipulated by compressed air in conjunction with the combustion of fuel in the cylinder.

With these preliminary remarks, the nature of the invention will readily be understood by reference to the drawings.

Figure 1 is a plan view of the crank shaft, the cam shaft and the admission control shaft. The reverse shaft lies under the control shaft, but is not shown in the review to avoid confusion of lines.

Figure 2 is a front view of the control shaft and the reverse shaft. The cam shaft lies back of the control shaft but is not shown to avoid confusion. The mechanism of the reverse shaft is shown in section.

Figures 6, 7:
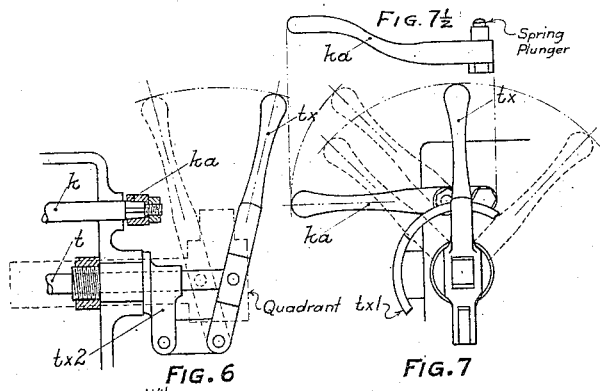
Figure 6 is a view of the reverse lever exterior to the engine frame and is a continuation of Figure 2 to the right.
Figure 7 is a projected view of Figure 6 and illustrates both the reverse lever and the control lever, and the amplitude of their movements.

Figure 7½ shows a top view of the lever "$k$—$a$" and is projected from Figure 7.

Figures 8, 9, 10:
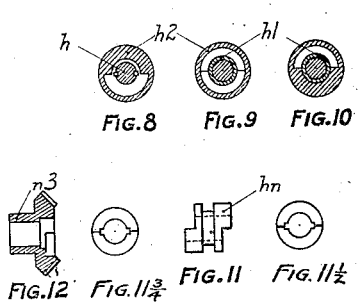

Figures 8, 9 and 10 are three sectional views of the "secondary coupling," $h$—2, upon the three section planes, D, E and F.

Figure 11 is a side view and two face views of the cam shaft coupling, $h$—$n$.

Fig. 11½ is an end view of one end of the cam shaft coupling "$h$—$n$" shown in Figure 11.

Fig. 11¾ is an end view showing the opposite end of the cam shaft coupling "$h$—$n$" shown in Fig. 11½.

Figure 12 is a sectional view of the "left drive gear," $n$—3.

In all these views and figures the same letters refer to the same parts throughout.

The cam shaft, $h$, revolves at the same angular velocity as the crank shaft and operates the inlet and admission valves of the engine. The exhaust takes place through ports in the walls of the cylinder uncovered by the piston. Air is supplied to the engine cylinders either through separate air pump cylinders or by means of annular pistons in the engine cylinders.

Figure 4:
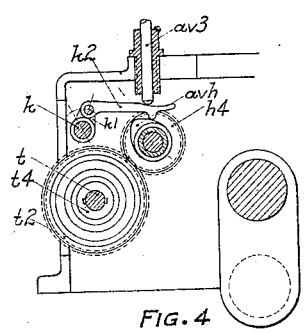
Figure 4 is a similar view upon the plane, A, and illustrates the admission cam and variable admission or cutoff mechanism, whereby the engine speed is controlled by changing the duration of the fuel admission period.
Figure 5:
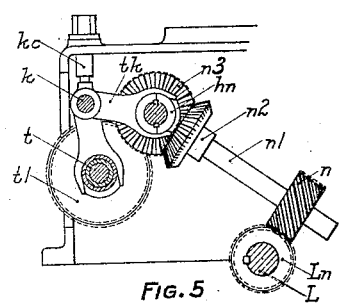
Figure 5 is a similar view upon the broken plane, C—C, and shows the geared connection between the crank shaft and the cam shaft.

The control shaft, $k$, rocks to and fro through a limited angle in response to the hand motion of the lever, $k$—$a$. In doing so, it shifts the position of the followers, $k$—2, Figure 4, horizontally to make contact with different portions of the admission cam, thereby changing the point of cutoff of the fuel.

The reverse shaft is operated by both a rocking motion through a limited angle and a sliding motion. The shaft is operated by the reverse lever, $t$—$x$, shown in Figures 6 and 7. The dotted lines show the amplitude of these movements.

The driving gear for the cam shaft consisted of a worm, $L$—$n$, mounted on the crank shaft, $L$; a worm gear, $n$, secured to the counter shaft, $n$—1, a bevel gear, $n$—2, secured to $n$—1 and meshing with two bevel gears, $n$—3 and $n$—4, mounted loosely on the cam shaft so that they can freely turn in either direction. A pair of bevel gears may be used in place of the worm gears, $L$—$n$, if desired. It will be seen that this arrangement drives one of the gears, $n$—3, in one direction while the other, $n$—4, is driven in the opposite direction.

A coupling, consisting of a short cylinder as shown in Figure 11 and sliding endwise on a pair of splines is mounted between the bevel gears, $n$—3 and $n$—4. A groove near the middle of the coupling receives the "reverse shaft," $t$—$k$, by means of which the coupling is slid endwise. The faces of the coupling are cut away to form jaws, as shown, which fit into complementary recesses in the respective gears, $n$—3 and $n$—4. When the coupling is engaged with one or the other of the gears, the cam shaft revolves with the gear engaged, either in the same direction as the crank shaft or opposite, depending upon the gear engaged.

Figure 1:
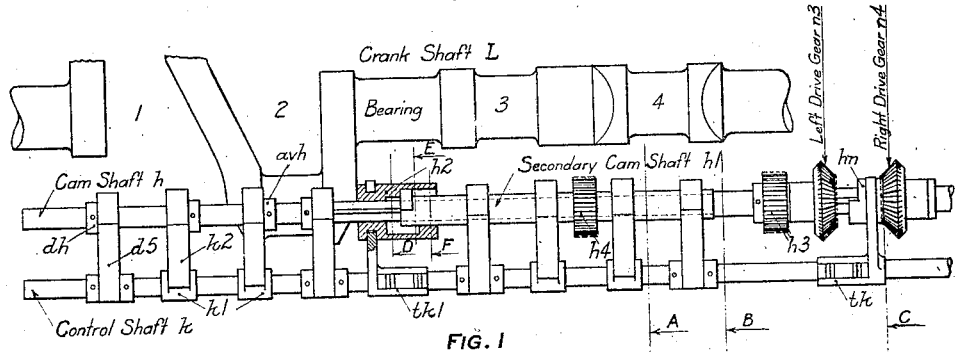
Figure 2:
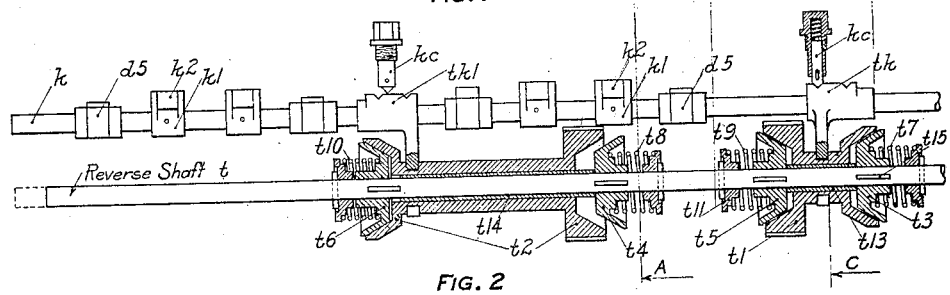
Figure 3:
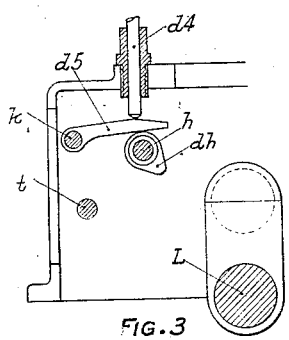
Figure 3 is a side view of one of the inlet valve cams of the engine, the view being taken upon a plane, B, and showing only the parts immediately behind the plane. The proper location of the crank shaft, the cam shaft, the control shaft and the reverse shaft are shown in this view.

Upon the reverse shaft is loosely mounted a gear, $t$—1, Figure 2, having an elongated hub which terminates in a bell shaped receptacle to form one member of a cone clutch. The gear is cupped to form one member of another cone clutch. Two cones, $t$—3 and $t$—5, constituting the other members of the clutches, are mounted on splines, $t$—15, and may slide endwise against the tension of the springs, $t$—7 and $t$—9. A sleeve, $t$—13, is mounted on the shaft between the splines and serves as stops for the cones, keeping them properly spaced and normally out of contact with the internal clutch faces. The gear, $t$—1, revolves freely on the sleeve, and may also slide endwise. This gear has a groove in the hub near the middle to receive an arm from the member, $t$—$k$. The member, $t$—$k$, therefore, has two arms, one engaging $h$—$n$ and the other engaging $t$—1. The gear, $t$—1, meshes with a gear, $h$—3, secured to the cam shaft, and, therefore, revolves freely with the cam shaft.

Referring to Figures 6 and 7, it will be seen that the reverse shaft, $t$, has an eye at its outer end by which it is pinned to the lever, $t$—$x$. The fulcrum, $t$—$x$—2, turns freely in the engine frame. The lever, $t$—$x$, can, therefore, be oscillated, as shown in Figure 6, thereby sliding the shaft, $t$, endwise or swung about, as shown in Figure 7, thereby rocking the shaft, $t$, to and fro. To properly synchronize these two movements, a quadrant, $t$—$x$—1, is secured to the engine frame and has a tongue which separates the lever movements so that, in order to oscillate the lever as shown in Figure 6, it is necessary to swing it to the right to its extreme position, as shown dotted in Figure 7, in order to clear the tongue of the quadrant.

It has been stated that reversing the engine reverses the sequence of the power impulses of the engine. This demands that, in a four cylinder two cycle engine, the cam shaft be divided into two sets of cams so that the relation of the two sets may be reversed when the engine is reversed. This I have done by providing a secondary cam shaft, $h$—1, composed of a sleeve freely revolving on the cam shaft, $h$, and carrying the cams for one pair of cylinders, the cranks of which are marked 3 and 4. This secondary cam shaft has a lug on the left hand end which engages with complementary recesses inside of the secondary coupling, $h$—2, in the same manner as has been explained in connection with the cam shaft coupling, $h$—$n$. The coupling, $h$—2, likewise, slides on a spline of the cam shaft, $h$, and revolves with it. The coupling is shifted by means of $t$—$k$—1, which slides freely on the shaft, $k$.

A gear, $e$—2, similar to $t$—1 (but having a longer hub to clear operating parts) and cones, $t$—4 and $t$—6, are mounted on the reverse shaft, $t$, in the same manner and for the same purpose as heretofore described in connection with the gear, $t$—1. A gear, $h$—4, is, likewise, secured to the secondary cam shaft, $h$—1, and meshes with the gear, $t$—2.

Two shift catches, $k$—$c$, which consists of a hollow screw into which a plunger is fitted and pressed out by a spring, engages V shaped notches in the members, $t$—$k$ and $t$—$k$—1. This retains these members in their proper running position and prevents the cone clutches from dragging.

When all the parts are in normal running position, the lever, $t$—$x$, Figure 7, may be freely swung its full amplitude without meeting any resistance. The lever rests normally upon the shoulder of the quadrant at its extreme left position. To reverse the engine, the lever is thrown to the right until it clears the tongue of the quadrant, then thrown over past the end of the tongue to the other side of the quadrant and swung back to the left, leaving it resting on the shoulder of the quadrant but on the other side of the tongue. This reverses the engine. The lever in Figure 7 is shown in mid-way position and the corresponding mechanism in Figure 2 shows that the reversing process has been half completed. The coupling, $h$—$n$, is engaged and the member, $t$—$k$, is in running position, as shown by the catch, $k$—$c$. The gear, $t$—1, is, likewise, in running position, as shown by its freedom from contact with either clutch cone. The parts to the left, which give the secondary cam shaft the proper angular throw in relation to the main cam shaft, are not in their running position. It will be seen that the cone, $t$—6, is firmly engaged; that the spring, $t$—10, is depressed and is forcing $t$—6 against $t$—2; that the lug on the end of the sleeve, $h$—1, is not yet in line with the recess in the coupling, $h$—2; and that the catch, $k$—$c$, has not yet engaged the V notch in $t$—$k$—1. As the reverse lever is moved further to the left, the angular motion of the shaft, $t$, revolves the cone, $t$—6, which, in turn, revolves the gear, $t$—2, and the secondary cam shaft, $h$—1, until the lug and recess in the coupling falls in line. As soon as this happens, the coupling engages the sleeve through the pressure of the spring, $t$—10, which forces $t$—6, $t$—2, $t$—$k$—1, and $h$—2 to the right until $t$—6 comes against the end of $t$—14. At this moment, the catch, $k$—$c$, is just engaging the notch, and the momentum of the parts and the pressure of the catch on the inclined surface throws the parts slightly farther, fully engaging the catch and giving the proper clearance between the clutch surface. The gear, $t$—2, is now perfectly free to revolve, the same as $t$—1, and both of these gears revolve with the cam shaft when the engine is started.

When the engine is again reversed, the lever, $t$—$x$, is first moved from the left to the right without any effect on the parts in Figure 2, but, as soon as it is oscillated into the position shown by the dotted lines in Figure 6, the cones, $t$—3 and $t$—4, are forced against the gears, $t$—1 and $t$—2, shifting all the sliding parts until the faces of the couplings, $h$—$n$ and $h$—2, rest against the faces of their counterparts. The springs, $t$—7 and $t$—8, then become depressed, holding $t$—3 and $t$—4 in contact while the lever, $t$—$x$, is being swung from right to left. This motion turns both portions of the cam shaft into position for the couplings to engage their counterparts, after which the clutches become automatically disengaged.

The operation of reversing the engine is assumed to be carried out after it has stopped, but no injurious effects would ensue if the process were performed while the engine was in motion, because the cone clutches need not grip with much force and any undue stress would simply cause them to slip.

I claim as new and desire to secure by Letters Patent:

1. A reverse mechanism for internal combustion engines comprising two gears loosely mounted on the cam shaft and rotating in opposite directions; a coupling to engage one or the other of said gears; a reverse shaft lying parallel to the said cam shaft; means of imparting angular and endwise motion to said reverse shaft; means of operating said coupling on cam shaft through endwise motion of said reverse shaft; and means of rotating said cam shaft through angular motion of said reverse shaft.

2. In a reverse gear for constant pressure internal combustion engines the combination of two gears mounted loosely on the cam shaft and driven from the crank shaft in opposite directions; a single reverse lever; means of connecting said cam shaft to either one or the other of said gears, thereby driving said cam shaft in the same angular direction or in opposite angular direction to the crank shaft; a sleeve mounted loosely on said cam shaft and carrying cams for a portion of the engine cylinders; means for connecting said sleeve to said cam shaft by the movements of said lever to give the proper angular relation between the cams on the cam shaft and the cams on the sleeve, in the process of reversing the engine.

3. A reverse mechanism comprising two gears mounted loosely on the cam shaft and rotating in opposite directions; a coupling to engage one or the other of said gears; a reverse shaft; a lever to impart angular and end motion to said reverse shaft; a loose gear on said reverse shaft meshing with a tight pinion on said cam shaft; means of engaging said loose gear and operating said cam shaft coupling through endwise motion of said reverse shaft; means of rotating said cam shaft through angular motion of said reverse shaft while said coupling is disengaged; means of disengaging said loose gear on reverse shaft through the engaging of said cam shaft coupling; and means of retaining said cam shaft coupling in engagement and said loose gear in neutral.

4. In a reverse gear for internal combustion engines having two drive gears on the cam shaft rotating in opposite directions and a cam shaft coupling between them to connect either one or the other of said gears to the cam shaft by an endwise motion; the combination therewith of a separate shaft parallel to the cam shaft and allowing of both an endwise and rocking motion; a gear loosely mounted on said shaft and meshing with a pinion on the cam shaft; a connection between said gear and the cam shaft coupling whereby their endwise motion is synchronized; a friction clutch on each side of said gear, one or the other of which becomes engaged by an endwise motion of the said shaft; means of rotating said separate shaft through a partial revolution, whereby said cam shaft is turned into the proper position (while the friction clutch is engaged) for the engagement of the cam shaft coupling with its respective drive gear; and means of disengaging the engaged friction clutch in synchronism with the engagement of the cam shaft coupling with its drive gear.

5. In a reverse gear for internal combustion engines the combination of two cam shaft drive gears revolving freely on the cam shaft and driven in opposite directions by the crank shaft; a cam shaft coupling revolving with the cam shaft between said drive gears and engaging with either gear by sliding endwise; a separate shaft parallel to the cam shaft and allowing endwise and rocking motions; a gear loosely mounted on said shaft and meshing with a pinion on the cam shaft; a connection between the said gear and the cam shaft coupling which synchronizes their endwise movements; a frictional catch to retain said connection in normal running positions; a friction clutch on each side of said gear and sustained by springs against end motion on the shaft and rotated with the said shaft by splines, one or the other of said friction clutches engaging with said gear whenever the said shaft is moved endwise; means of moving the said shaft endwise and then giving it a turn, whereby the cam shaft coupling is disengaged from one drive gear, the cam shaft rotated through the proper angle and the said coupling engaged with the other drive gear, said latter process automatically releasing the gear on the separate shaft from the friction clutch.

PAUL ANDREW LAWRENCE.

Witnesses:
 OSCAR R. KIRSCHKE,
 FRANK CROCKER.